United States Patent
Van Den Nieuwenhuyzen et al.

(10) Patent No.: US 8,418,738 B2
(45) Date of Patent: Apr. 16, 2013

(54) ADDITIONAL SIDEWALL ARMATURE FOR A HEAVY GOODS VEHICLE TIRE

(75) Inventors: Karl Van Den Nieuwenhuyzen, Beauregard Vendon Rouzat (FR); Philippe Esnault, Clemont-Ferrand (FR); Michael Cogne, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 619 days.

(21) Appl. No.: 12/523,674

(22) PCT Filed: Dec. 19, 2007

(86) PCT No.: PCT/EP2007/064193
§ 371 (c)(1),
(2), (4) Date: Mar. 11, 2010

(87) PCT Pub. No.: WO2008/098639
PCT Pub. Date: Aug. 21, 2008

(65) Prior Publication Data
US 2010/0181001 A1  Jul. 22, 2010

(30) Foreign Application Priority Data

Jan. 17, 2007 (FR) ...................................... 07 00340

(51) Int. Cl.
*B60C 13/00* (2006.01)
*B60C 9/08* (2006.01)
*B60C 9/09* (2006.01)

(52) U.S. Cl.
USPC .......................................... 152/555; 152/560

(58) Field of Classification Search .................. 152/555, 152/561; *B60C 9/09, 13/00*
See application file for complete search history.

(56) References Cited

U.S. PATENT DOCUMENTS

| | | | |
|---|---|---|---|
| 5,392,830 A | 2/1995 | Janello et al. | |
| 5,529,104 A * | 6/1996 | Delias et al. | 152/456 |
| 2006/0054260 A1* | 3/2006 | Allard | 152/545 |
| 2006/0108043 A1* | 5/2006 | Suzuki | 152/550 |

FOREIGN PATENT DOCUMENTS

| | | |
|---|---|---|
| EP | 0 038 019 | 10/1981 |
| GB | 1 072 305 | 6/1967 |
| JP | 62 001605 | 1/1987 |
| JP | 01 067405 | 3/1989 |
| JP | 04 201611 | 7/1992 |
| JP | 05 058119 | 3/1993 |
| WO | WO 02/096674 | 12/2002 |
| WO | WO 2004078494 A1 * | 9/2004 |

* cited by examiner

*Primary Examiner* — Justin Fischer
*Assistant Examiner* — Philip N Schwartz
(74) *Attorney, Agent, or Firm* — Cozen O'Connor

(57) ABSTRACT

A tire 10 comprises a radial carcass reinforcement 2 surmounted radially on the outside by a crown reinforcement 31, the carcass reinforcement 2 being formed of a plurality of metal reinforcing elements 21. The tire also includes two sidewalls 1, at least one of the sidewalls comprising an additional reinforcing reinforcement 5 wherein the additional reinforcement 5 comprises, in the circumferential direction, on the tire a plurality of first parts 51 and of second parts 52 that have rupture strengths, that is to say, forces that rupture per unit width of reinforcement, that are such that the rupture strength of the second parts 52 is lower than the rupture strength of the first parts. The first parts 51 and the second parts are arranged such that they alternate in the circumferential direction.

6 Claims, 3 Drawing Sheets

ADDITIONAL SIDEWALL ARMATURE FOR A HEAVY GOODS VEHICLE TIRE

RELATED APPLICATIONS

This is a U.S. national stage under 35 USC §371 of application No. PCT/EP2007/064193, filed on Dec. 19, 2007.

This application claims the priority of French application Ser. No. 07/00340 filed Jan. 17, 2007, the entire content of which is hereby incorporated by reference.

FIELD OF THE INVENTION

The invention relates to tires that have a metal carcass reinforcement and more particularly to how such tires are reinforced in their sidewalls.

BACKGROUND OF THE INVENTION

Usually, tires intended for uses on heavy vehicles comprise a carcass reinforcement formed of at least one ply of metal reinforcing elements coated in a rubber material, this reinforcement additionally having the role of withstanding the internal inflation pressure of the tire. This carcass reinforcement is anchored at its ends into tire beads which are intended to come into contact with seats of a mounting rim. The carcass reinforcement may notably be anchored by wrapping it around the circumferential bead reinforcement such as a bead wire. A carcass reinforcement is said to be radial in this document if the reinforcing elements of which it is made make a mean angle greater than 75° with the circumferential direction.

Furthermore, the tire comprises, radially beyond the beads, sidewall zones that experience cyclic variations in curvature during rolling each time they come into contact with the road surface. The carcass reinforcement is also surmounted with a crown reinforcement generally formed of several plies of reinforcing elements crossing one another, this crown reinforcement itself being radially surmounted on the outside by a tread intended to come into contact with the roadway as the tire runs along.

During running, the sidewalls of the tire, and therefore the carcass reinforcement, are subjected to cyclic variations in curvature. These cyclic bending stresses in the reinforcing elements of the carcass reinforcement are amplified when the tire is partially, or even fully, deflated: on the one hand, the amplitude between the maximum radius of curvature and the minimum radius of curvature increases and, on the other hand, the value of the minimum radius of curvature decreases.

This mechanism may, for example, come into play if tires are being used in tandem, one of the tires being partially or completely deflated and the other remaining inflated. When this happens, the carcass reinforcement of the deflated tire is subjected to a low or zero tension, given the lack of inflation pressure, while at the same time being subjected to variations in curvature. These high bending cycles, while the reinforcing elements of the carcass reinforcement are not taut, generate fatigue in the metal reinforcing elements of the carcass reinforcement.

This fatigue of the metal reinforcing elements decreases their rupture strength under tension and may lead to the tire bursting when it is reinflated to its nominal pressure, notably following repair. This problem is known by the name of "zipper failure". The bursting is accompanied by a failure extending over a shorter or longer circumferential length in one of the sidewalls. With this bursting, an overpressure wave travels through the vicinity of the tire.

SUMMARY OF THE INVENTION

The present invention seeks not to reduce the fatigue in the metal reinforcing elements but rather to limit the overpressure wave that results from a bursting at the time of reinflation of a tire the carcass reinforcement of which may have suffered fatigue of its metal reinforcing elements.

One objective of this invention is to limit the overpressure in the vicinity of the tire that results from the release of energy as the failure of the carcass reinforcement spreads.

To this end, one aspect of the invention is directed to a tire comprising a radial carcass reinforcement surmounted radially on the outside by a crown reinforcement, the carcass reinforcement being formed of a plurality of metal reinforcing elements coated in a rubber coating material, the reinforcing elements of the carcass reinforcement making an angle at least greater than 75° with the circumferential direction, the tire further comprising beads to be in contact with a mounting rim, the carcass reinforcement being anchored in these beads. The tire comprises two sidewalls, each sidewall extending between a bead and the crown, at least one of the sidewalls comprising an additional reinforcing reinforcement. The additional reinforcement comprises, in the circumferential direction, a plurality of first parts and a plurality of second parts that have rupture strengths, that is to say, forces that rupture per unit width of reinforcement, that are such that the rupture strength of the two parts is lower than the rupture strength of the first parts, the first parts and the second parts being arranged such that they alternate in the circumferential direction. The rupture force per unit width of a reinforcement corresponds to the force that has to be applied in a given direction and to a unit width of reinforcement in order to cause the said reinforcement to fail substantially at right angles to the direction of the applied force.

The additional reinforcement which comprises a succession of first parts and of second parts with different rupture strengths, forms a kind of barrier to the spread, in the circumferential direction, of the failure of the reinforcing elements of the carcass reinforcement, by limiting the total circumferential length of the opening. Surprisingly, it has been found that by significantly reducing the circumferential length of the opening in the sidewall of the tire, it is possible to reduce the blast effect produced by the bursting of the tire.

As a preference, the additional reinforcement extends in at least one of the sidewalls between a point situated radially on the inside of the axially outermost point of the profile of the carcass reinforcement of the tire mounted on its mounting rim and inflated to its working pressure, and a point situated in the vicinity of the axial end of the crown reinforcement. This sidewall is preferably positioned on the outside of the vehicle on which the tire is mounted.

In a preferred alternative form of embodiment, the additional reinforcement is formed of a ply of textile reinforcing elements capable of withstanding the bending cycles to which the carcass reinforcement is subjected; what capable of withstanding the bending cycles means is that these reinforcing elements more or less maintain their rupture strength in the initial state. To form the first parts, of greater rupture strength, it is possible to use textile reinforcing elements of greater rupture strength than those of the textile reinforcing elements of the second parts. These textile reinforcing elements may be directed in the meridian direction, that is to say in a plane containing the axis of rotation of the tire, or alternatively in any other direction.

In another preferred alternative form of embodiment, the additional reinforcement comprises only a plurality of first parts, each formed of a ply of textile reinforcing elements, and not connected to one another in the circumferential direction. The textile reinforcing elements are arranged radially on the tire, that is to say in a direction that makes an angle equal to 90 degrees with the circumferential direction on the tire. The space between two first parts corresponds to a second part of zero rupture strength. These second parts comprise no reinforcing element nor do they even contain any rubber blend. This alternative form of embodiment is particularly well suited to instances in which the first parts comprise metal reinforcing elements.

In another alternative form of embodiment, the second parts may be made of the same rubber blend as that of the first parts in order to make the additional reinforcement easier to lay while the tire is being manufactured.

In another alternative form of embodiment, the additional reinforcement is a ply made of a rubber blend reinforced with textile reinforcing elements parallel to one another, these textile reinforcing elements being cut at least one point along their length over a plurality of regions of the said ply. What is meant here by region is that over a given width of the ply corresponding to the width of the said region (and measured at right angles to the reinforcing elements of the additional reinforcement), the reinforcing elements are all cut in such a way as to create, in the said additional reinforcement, a second part with a low rupture strength. As a preference, the at least one cut made in a reinforcing element is located in such a way as to be situated in the sidewall of the tire in the region of the said sidewall that corresponds to the axially outermost point of the carcass reinforcement (axially outwards being considered with reference to the internal cavity of the tire) or even radially outwards from this point.

Provision may also be made for the additional reinforcement to be reinforced in these second parts of low rupture strength using discontinuous reinforcing elements. These discontinuities can easily be obtained once the additional reinforcement with continuous reinforcing elements has been made by cutting each of the reinforcing elements at several points in order to constitute second parts.

In another alternative form of embodiment, the additional reinforcement is a ply made of a rubber blend reinforced by a succession of reinforcing elements of different kinds with different rupture strengths, these reinforcing elements being arranged substantially parallel to one another. The reinforcing elements of the same kind are grouped in such a way as to constitute parts of appropriate mean circumferential length. These parts with different rupture strength are arranged alternately in the circumferential direction.

As a preference, the textile reinforcing elements of the additional reinforcement are chosen from polyamide or aramid reinforcing elements; they may also be of a hybrid kind, that is to say formed with at least two textile cords of different kinds.

While the additional reinforcement can just as easily be positioned on one side of the carcass reinforcement as it can on the other, it may none the less be advantageous for it to be positioned axially and radially on the outside of the carcass reinforcement (the said carcass reinforcement therefore finds itself between the additional reinforcement and the internal cavity of the tire in which the tire inflation pressure acts). It is also possible to provide a decoupling material between the carcass reinforcement and the additional reinforcement.

In all the alternative forms presented, that use reinforcing elements, it is advantageous for these reinforcing elements of the additional reinforcement to make, on the tire, an angle of, or differing very slightly from, 90 degrees (that is to say of at least 80 degrees) with the circumferential direction.

BRIEF DESCRIPTION OF THE DRAWINGS

Other features and advantages of the invention will emerge from the description given hereinafter with reference to the attached drawings which, by way of nonlimiting examples, show some embodiments of the subject matter of the invention.

DETAILED DESCRIPTION OF THE DRAWINGS

Figure 2:
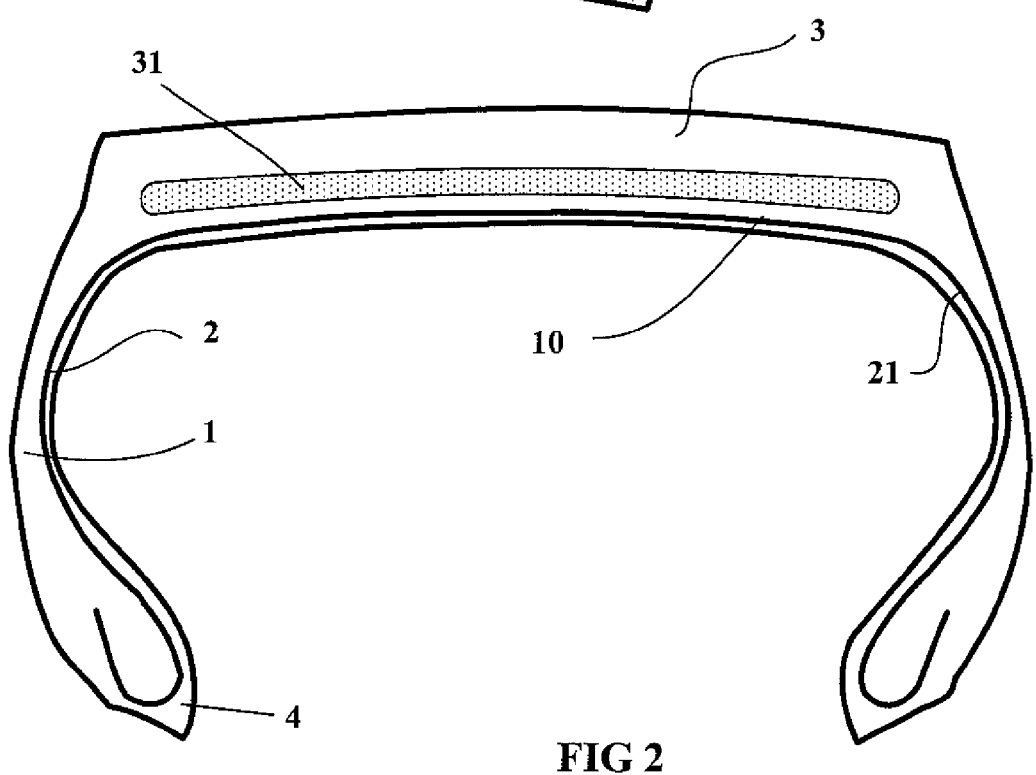
FIG. 2: a view in meridian section of a tire according to the prior art.

The tire 10, of size 315/80 R 22.5 shown in meridian section in FIG. 2, that is to say in a plane of section containing the axis of rotation of the tire, comprises sidewalls 1 on each side of a crown 3, each sidewall 1 ending in beads 4 intended to be in contact with a mounting rim (not depicted in this figure). This tire is reinforced by a carcass reinforcement 2 itself formed of a plurality of reinforcing elements 21 directed in such a way as to make an angle of 90 degrees with the circumferential direction (the direction which is perpendicular to the plane of FIG. 2). The reinforcing elements 21 of the carcass reinforcement are collections of 19 threads 0.18 mm in diameter with no band around the said reinforcing elements. The carcass reinforcement extends into the crown 3 and is surmounted radially on the outside by a crown reinforcement 31; the carcass reinforcement extends into the sidewalls 1 and ends with an anchoring into the beads 4.

For this size of tire, the volume of the internal cavity, that is to say the volume containing the inflation pressure, is 140 liters.

Figure 1:
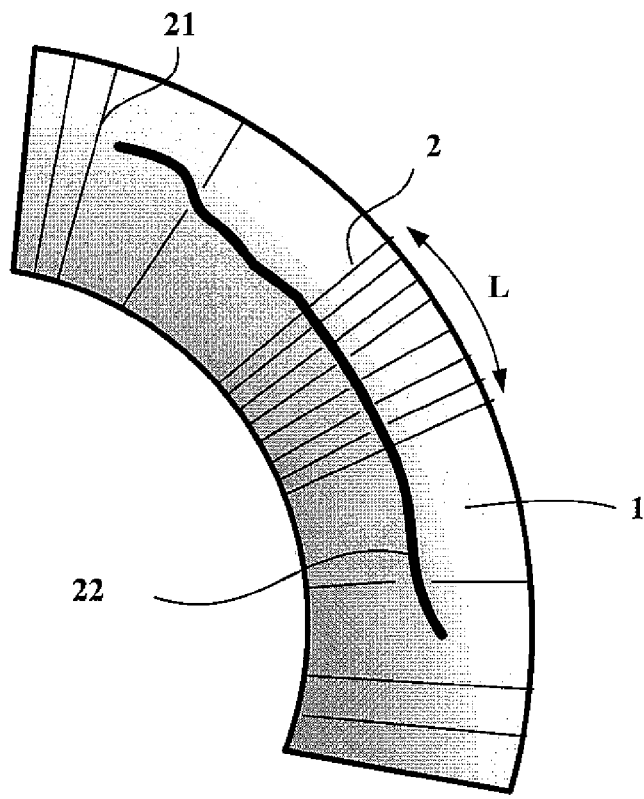
FIG. 1: a part view of a sidewall of a tire with a radial carcass reinforcement after a burst test.

FIG. 1 partially shows one of the sidewalls 1 of the tire depicted in FIG. 2 after it has undergone a burst test. This test consists, having previously cut the carcass reinforcing elements 21 over a circumferential length L of between 30 and 80 mm (measured substantially at the axially outermost point of the tire), in fitting the tire onto a wheel and in inflating this tire until it bursts. During this test, the burst pressure and the acoustic pressure 1 m away from the tire are measured. After the test, the circumferential length of the opening 22 in the sidewall of the tire is measured.

In this particular case, a tire of size 315/80 R 22.5 for which the cut zone has a circumferential length L of 30 mm, the measured acoustic pressure reaches a value of 4.5 bar for a burst pressure of 14 bar. The circumferential length of the opening after bursting is equal to 550 mm. In another particular instance using a tire of the same size, for which the cut zone has a circumferential length L of 80 mm, the measured acoustic pressure reaches a value of 3.5 bar for a burst pressure of 9 bar. The circumferential length of the opening after the bursting is equal to 450 mm.

Figure 3:
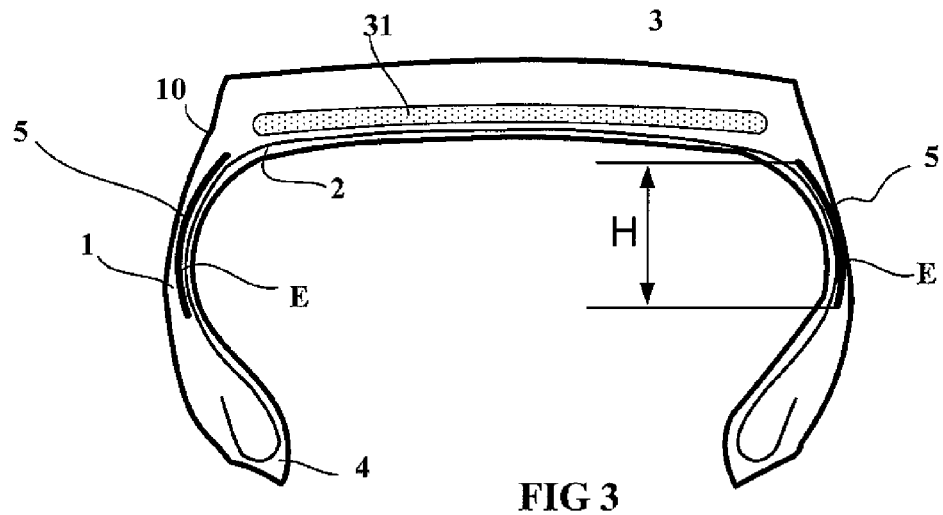
FIG. 3: a view in meridian section of a tire according to the invention.

According to one alternative form of tire 10 according to the invention, shown in FIG. 3, each sidewall 1 comprises, on the outside of the carcass reinforcement, an additional reinforcement 5. This additional reinforcement extends over a radial distance H, in the plane of FIG. 3, on each side of the point E of the carcass reinforcement which is axially the outermost point when the tire is inflated to its nominal pressure. This additional reinforcement ends near the crown reinforcement 31.

Figure 4:
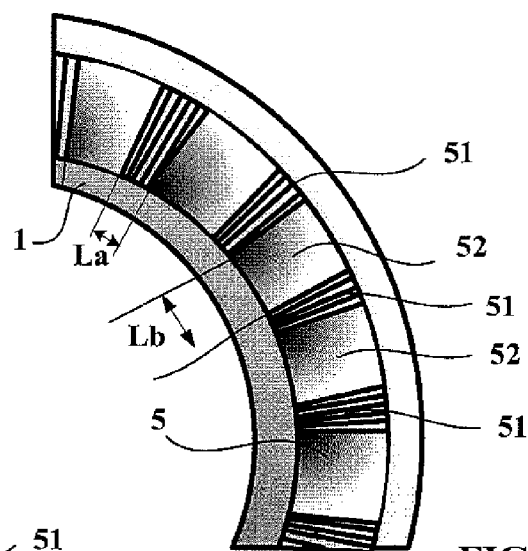
FIG. 4: a partial view of a sidewall of the tire of FIG. 3.

FIG. 4 shows a sidewall 1 of the tire 10 shown in cross section in FIG. 3. The additional reinforcement 5, visible in FIG. 4, is formed as a ply comprising a succession of first parts 51 of width La and of second parts 52 of width Lb, these parts being arranged in alternation (a first part 51 follows a second part 52). The first parts 51 and the second parts 52 substantially maintain their respective widths La, Lb at the radially innermost points. The first parts 51 have a rupture strength, when submitted to a force in the direction of the reinforcing elements, which is greater than the rupture strength of the second parts 52 in the same direction. What rupture strength means here is the rupture force in daN per unit length in decimeters (dm) (the rupture strength of a reinforcement reinforced with reinforcing elements is substantially equal to the rupture force of each reinforcing element multiplied by the number of reinforcing elements per decimeter).

Each first part 51 of high rupture strength is made of a rubber material reinforced with mutually parallel cords. The cords are arranged in such a way as to obtain, when the reinforcement is manufactured, 80 cords per decimeter. The cords are made of aramid 330*2-230/230 and have an individual rupture force of the order of 100 daN.

Each first part 51 is of a mean width of 25 mm. One decimeter of ply contains approximately 80 reinforcing elements per decimeter (dm); these parts A therefore have a rupture strength Fra of 8000 daN/dm.

Each second part 52, of a width of 50 mm, is formed using the same rubber blend as that which connects the reinforcements of the first parts 51, but without any reinforcing element. The rupture force of the second parts is very much lower than that of the first parts because it is substantially equal to the rupture force of the rubber blend, that is to say 20 daN/dm for the same levels of thickness.

On a sidewall 1, the tire is prepared for the burst test described above by cutting the reinforcing elements of the carcass reinforcement over a circumferential length of 80 mm. This cutting is done to a number of tires so that the cuts are positioned in a number of ways with respect to the first and second parts of the additional reinforcement 5.

Figure 5:
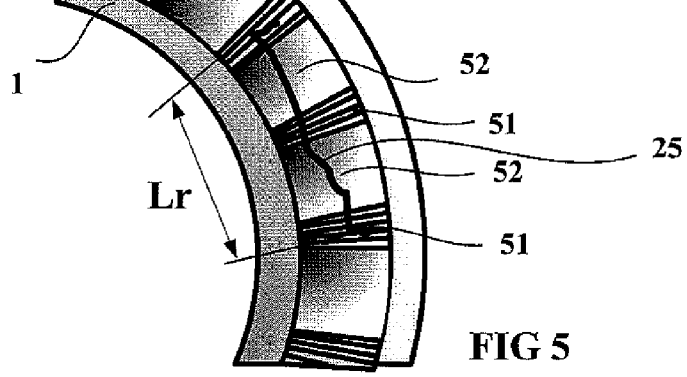
FIG. 5: a partial view of the sidewall of the tire of FIG. 3 after the burst test.

FIG. 5 shows one of the results obtained, the initial cut affecting a first part 51 and partially affecting two second parts 52. Once the tire has burst, it can be seen that the opening 25 in the sidewall has a circumferential length Lr of less than 150 mm. It can further be noted that the overpressure at the time of bursting has changed from 10 bar for a tire of the same size without an additional reinforcement, to under 1 bar for the tire according to the invention.

As a preference, the rupture strength of the first parts 51 is at least equal to 3000 daN/dm and more preferably still at least equal to 5000 daN/dm for a tire intended to be fitted to a heavy vehicle.

As a preference, the rupture strength of the second parts is at most equal to 300 daN/dm and more preferably still at most equal to 100 daN/dm.

It is easy for a person skilled in the art to adapt the invention to suit customary heavy vehicle tire sizes in the knowledge that, for preference, the width of a part of lower rupture strength ranges between 20 and 60 mm and more preferably still, between 30 and 40 mm.

Furthermore, for the customary ranges of tires for heavy vehicles, it is sensible to choose, in combination with the rupture strength values given above, width values that are such that the sum of the widths of a first part and of a second part is at least equal to 40 mm and at most equal to 80 mm as this makes it possible, in the test performed, which consists in cutting a large proportion of the reinforcing elements of the carcass reinforcement over a width L of 80 mm, to obtain a length of sidewall opening upon bursting of less than 150 mm and thus limit the overpressure 1 meter away to a value of below 1 bar.

FIGS. 6, 7, 8 and 9 show alternative forms of embodiment of additional reinforcement for implementing the invention.

Figure 6:
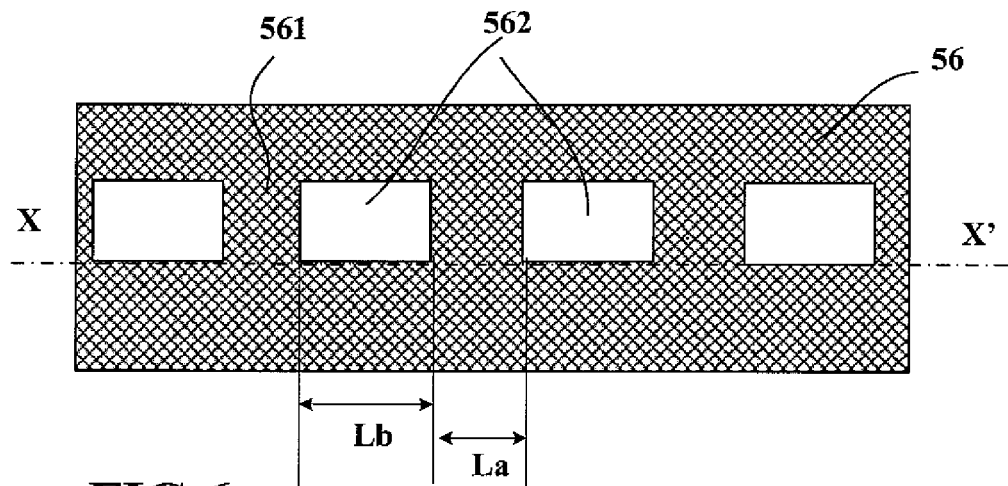
FIG. 6: a view of an alternative form of additional reinforcement.

The additional reinforcement 56 shown in FIG. 6 is formed in a ply of crisscross fabric (warp and weft threads crossing one another), the threads of which it is made making an angle of 45° with the main direction XX' of the said reinforcement. A plurality of openings 560 are punched out of the said fabric evenly in the direction XX' of the fabric which is intended to be laid circumferentially on the tire. In this way, first parts 561 of width La between the openings 560 and second parts 562 covering the said openings 560 of width Lb are created.

Figure 7:
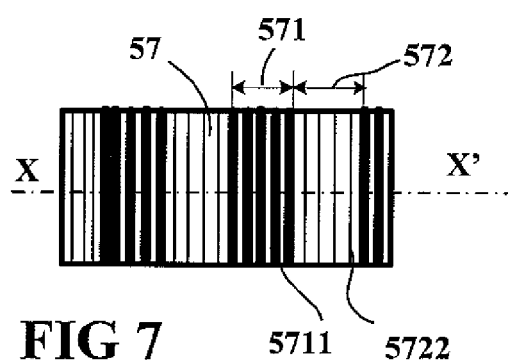
FIG. 7: a view of another alternative form of additional reinforcement.

The additional reinforcement 57 shown in FIG. 7 comprises a plurality of first parts 571 and of the second parts 572 arranged in alternation. The first parts 571 are reinforced with reinforcing elements 5711 and the second parts 572 are reinforced with reinforcing elements 5722. The reinforcing elements 5711 have a rupture force greater than the rupture force of the reinforcing elements 5722. The spacing at which the reinforcing elements are laid is the same for the first and the second parts.

Figure 8:
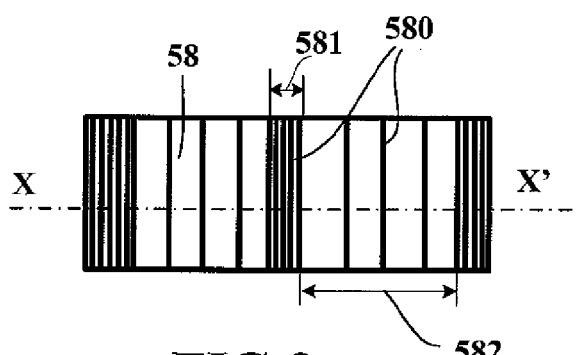
FIG. 8: a view of another alternative form of additional reinforcement.

The additional reinforcement 58 shown in FIG. 8 comprises a plurality of first parts 581 and of second parts 582 arranged in alternation in the direction XX'. The first parts 581 and the second parts 582 are reinforced with the same reinforcing elements 580 which are laid at different spacings in the said parts. The laying spacing in the second parts 582 is very much greater than the laying spacing of the reinforcing elements in the first parts 581.

Figure 9:
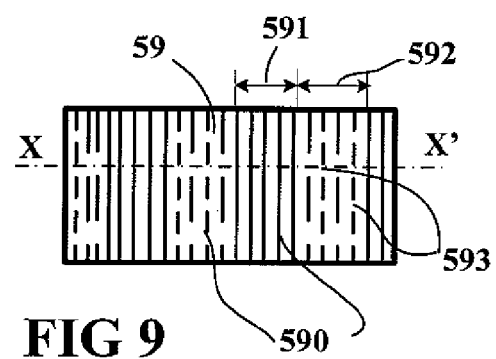
FIG. 9: a view of another alternative form of additional reinforcement.

The additional reinforcement 59 shown in FIG. 9 comprises a plurality of first parts 591 and of second parts 592 arranged in alternation. The first parts 591 and the second parts 592 are reinforced with the same reinforcing elements 590 which are laid at identical spacings in the said parts. Before this additional reinforcement is incorporated into a tire, a plurality of cuts 593 are made along the reinforcing elements of the second parts 592 so that they have a tensile rupture strength in the direction of the reinforcing elements which is very much lower than the rupture strength of the first parts 591.

Advantageously, the number of reinforcing elements in the additional reinforcement per decimeter in the first parts is greater than 90 reinforcing elements, preferably greater than 110 reinforcing elements. Likewise, the distance between two reinforcing elements is less than 0.5 mm and preferably less than or equal to 0.3 mm.

In all the examples described, the additional reinforcement may be extended on each side of the sidewalls to the extent that it runs under or over the crown reinforcement and into the beads.

The device of the invention is particularly advantageous when the tire has a high internal cavity volume, associated with a high inflation pressure level, as is the case in tires for heavy goods vehicles, aeroplanes and works and agricultural vehicles.

The invention claimed is:

1. A tire comprising:
   a radial carcass reinforcement surmounted radially on the outside by a crown reinforcement, the carcass reinforcement being formed of a plurality of metal reinforcing elements coated in a rubber coating material, the reinforcing elements of the carcass reinforcement making an angle greater than 75° with the circumferential direction;
   beads adapted to be in contact with a mounting rim, the carcass reinforcement being anchored in said beads; and
   two sidewalls, each sidewall extending between a bead and the crown, at least one of the sidewalls comprising an additional reinforcement, wherein the additional reinforcement comprises, in the circumferential direction, a plurality of first parts and of second parts that have rupture strengths, that is to say, forces that rupture per unit width of reinforcement, that are such that the rupture strength of the second parts being lower than the rupture strength of the first parts, the first parts and the second parts being arranged such that they alternate in the circumferential direction, wherein the additional reinforcement extends in at least one of the sidewalls at least between a point situated radially on the inside of the axially outermost point of the profile of the carcass reinforcement of the tire mounted on its mounting rim and inflated to its working pressure, and a point situated in the vicinity of the axial end of the crown reinforcement, and wherein the additional reinforcement is positioned axially and radially on the inside of the carcass reinforcement.

2. The tire according to claim 1, wherein the additional reinforcement includes in its first parts a plurality of textile reinforcing elements arranged in a direction that makes an angle equal to 90 degrees with the circumferential direction on the tire.

3. The tire according to claim 1, wherein the rupture strength of the first parts is at least equal to 3000 daN/dm.

4. The tire according to claim 1, wherein the rupture strength of the second parts is at most equal to 300 daN/dm.

5. The tire according to claim 2, wherein the reinforcing elements of the first parts of the additional reinforcement that have a greater rupture strength are chosen from textile reinforcing elements of the polyamide or aramid kind, or hybrid reinforcing elements formed with at least two textile reinforcing elements of different kinds.

6. The tire according to claim 1, wherein the second parts of the additional reinforcement comprise a plurality of discontinuous reinforcing elements, these reinforcing elements running in a radial direction.

* * * * *